United States Patent [19]
Tung et al.

[11] Patent Number: 6,148,394
[45] Date of Patent: Nov. 14, 2000

[54] APPARATUS AND METHOD FOR TRACKING OUT OF ORDER LOAD INSTRUCTIONS TO AVOID DATA COHERENCY VIOLATIONS IN A PROCESSOR

[75] Inventors: Shih-Hsiung Stephen Tung, Austin; David Scott Ray, Georgetown; Kevin Arthur Chiarot, Pflugerville; Barry Duane Williamson, Round Rock, all of Tex.

[73] Assignee: International Business Machines Corporation, Armonk, N.Y.

[21] Appl. No.: 09/021,134

[22] Filed: Feb. 10, 1998

[51] Int. Cl.$^7$ ............................... G06F 9/312; G06F 9/38
[52] U.S. Cl. ........................................... 712/218; 712/219
[58] Field of Search .................................. 712/216, 218, 712/219, 225, 41, 42

[56] References Cited

U.S. PATENT DOCUMENTS

| | | | |
|---|---|---|---|
| 5,420,990 | 5/1995 | McKeen et al. | 712/216 |
| 5,467,473 | 11/1995 | Kahle et al. | 712/216 |
| 5,737,636 | 4/1998 | Caffo et al. | 712/54 |
| 5,781,752 | 7/1998 | Moshovos et al. | 712/216 |
| 5,809,275 | 9/1998 | Lesarte | 712/216 |
| 5,898,853 | 4/1999 | Panwar et al. | 712/216 |
| 5,903,739 | 5/1999 | Dice | 712/216 |

FOREIGN PATENT DOCUMENTS

| | | |
|---|---|---|
| 5-53806 | 3/1993 | Japan . |
| 5-210586 | 8/1993 | Japan . |
| 08314721 | 11/1996 | Japan . |

*Primary Examiner*—Richard L. Ellis
*Attorney, Agent, or Firm*—Anthony V.S. England

[57] ABSTRACT

The present invention is directed towards a means to detect and reorder out of order instructions that may violate data coherency. The invention comprises a mis-queue table for holding entries of instruction data, each entry corresponding to an instruction in a computer microprocesor. The instruction data in each entry comprises: i) address information for the instruction; ii) ordering information for the instruction, indicating the order of the instruction relative to other instructions in the mis-queue table; iii) data modification information for the instruction, for indicating a possibility of modified data; and iv) out of order information, for indicating that a newer instruction has completed before the corresponding older instruction to the entry. The invention also comprises an out of order comparator for comparing an address of a completed instruction to any address information entries in the miss queue. If a completed instruction accesses the same address as another instruction, as indicated in the address information in the mis-queue table, and the completed instruction is newer than the matched instruction, the out of order field is marked indicating this condition exists. The invention comprises a modification comparator. This compares addresses from data altering events to those addresses in the entries in the mis-queue table. On a match, the modification field of the corresponding entry is marked to indicate this condition exists. When an instruction entry indicates that the corresponding instruction's data is modified, and that the instruction is out of order, all subsequent instructions are canceled.

7 Claims, 5 Drawing Sheets

APPARATUS AND METHOD FOR TRACKING OUT OF ORDER LOAD INSTRUCTIONS TO AVOID DATA COHERENCY VIOLATIONS IN A PROCESSOR

FIELD OF THE INVENTION

This invention relates generally to the field of computer processors, and more particularly, to processors which are integrated on a single microprocessor chip. Still more particularly, the invention relates to detection and correction of data coherency problems inherent in out of order processing, especially in a multiple CPU system.

BACKGROUND OF THE INVENTION

Providing ever faster microprocessors is one of the major goals of current processor design. Many different techniques have been employed to improve processor performance. One technique which greatly improves processor performance is the use of cache memory. As used herein, cache memory refers to a set of memory locations which are formed on the microprocessor itself, and consequently, has a much faster access time than other types of memory, such as RAM or magnetic disk, which are located separately from the microprocessor chip. By storing a copy of frequently used data in the cache, the processor is able to access the cache when it needs this data, rather than having to go "off chip" to obtain the information, greatly enhancing the processor's performance.

However, certain problems are associated with cache memory. In particular, a great problem exists when multiple processors are employed in a system and need the same data. In this case, the system needs to ensure that the data being requested is coherent, that is valid for the processor at that time. Another problem exists when the data is stored in the cache of one processor, and another processor is requesting the same information.

Superscalar processors achieve performance advantages over conventional scalar processors because they allow instructions to execute out of program order. In this way, one slow executing instruction will not hold up subsequent instructions which could execute using other resources on the processor while the stalled instruction is pending.

In a typical architecture, when an instruction requires a piece of data, the processor goes first to the onboard cache to see if the data is present in the onboard cache. Some caches have two external ports, and the cache can be interleaved. This means that, for example in FIG. 1, a cache 100 has two cache banks, 140 and 130. One cache bank could be for odd addresses and the other cache bank would then be for even addresses.

Internally, each cache bank 140 and 130 cache has an internal input port (not shown) to which address information of a cache request is made. In FIG. 1, the data for address A1 is stored on cache line 110 in cache bank 130, and the data for address A2 is stored on cache line 120 in cache bank 140. Cache 100 has two external ports for input data, port 180 and port 190.

Cache request 1 shows a cache request for an instruction 1 (not shown), and Request 2 shows a cache request for instruction 2 (not shown). Instruction 1 is an older instruction than instruction 2, meaning it should be executed before instruction 2. If a superscalar processor has multiple load units, such as in the PowerPC™ processor from IBM Corporation, Austin, Tex., then both instructions could make a cache request at the same time. In the example shown, both instruction 2 and instruction 1 are attempting to access data at address A1, and have submitted cache requests to cache 100 to do so.

Since bank 130 only has one internal input port, both cache requests cannot be processed at the same time. This is due to the interleaved nature of cache 100.

FIG. 2 shows what happens when cache request 2 accesses cache bank 130 before cache request 1. Cache request 2 hits in cache bank 130 for the data it needs. However, cache request 1 cannot access cache bank 130 until at least the next cycle. Thus, newer instruction 2 can get the data it needs before older instruction 1 can. Newer instruction 2 can complete before older instruction 1 in this case because of this port allocation conflict.

The same ordering problem can occur when an older instruction misses in the cache, and a newer instruction hits. A miss occurs when the address of the data cannot be found in the memory management unit, and the memory management unit must then request that the data be brought from higher memory. A hit occurs when both the address of the data and the data are accessible through the memory management unit and the cache, and this data can be output to an instruction waiting for it.

A cache miss with an older instruction followed by a cache hit by a newer instruction, both attempting to access the same data, can occur when the real address of the data is represented by two different effective addresses. When the effective address requested by the newer instruction and its data are already accessible by the memory management unit and the cache, and where the older instruction address and data is not accessible in the memory management unit and the cache, this also leads to a situation where a newer instruction accessing the same data as an older instruction can complete before the older instruction.

In multi-processor systems, a cache miss in one processor may trigger a "snoop" request to the other processors in the system. This snoop request indicates to the other processors that the data being "snooped" is being requested by another processor, and the other processors should determine whether the address being sought resides in their own cache. If it is, the main memory data should be made coherent, that is updated to reflect the correct current state of the system state.

In terms of superscalar architecture, this problem is compounded by the fact that any loads may be finished out of order, or in other words, a newer instruction may be marked for completion before an older one. That is, a newer instruction may be marked as set to execute before an older one is. Thus, two load instructions may address the same cache location, and the newer instruction may actually be furnished with a piece of data before the older instruction. Thus, the newer instruction be marked for completion out of order possibly causing false data to be used in the completion of the instruction. When a later load instruction bypasses an earlier load instruction, the earlier load instruction may get newer data than it should have received based on the original program order.

Previous solutions to this coherency problem include the one detailed in U.S. patent application, Ser. No. 08/591,249 filed Jan. 18, 1996, now U.S. Pat. No. 5,737,636, entitled A Method and System for Bypassing in a Load/Store Unit of a Superscalar Processor. In this solution, a Load Queue held a page index and a real address along with a an ID and a valid bit. The ID indicated the program order of the load instruction.

In addition to the aforementioned entries, the Load Queue entry also held a modified field which indicates whether the cache line entry for the address has been modified. When a cache access, such as a store instruction or a snoop request, indicates that the cache line may have been modified, the Load Queue is searched. If it contains an entry for the same line, the modified bit is set to indicate a possible modification.

Any subsequent load would perform a comparison of the Load Queue entries. If the same line is pending in the Load Queue and marked as modified, the ID field is checked. If the current line is older than that which was pending and modified, the pending loads in the Load Queue are canceled and re-executed after the subsequent load. This avoids the problem of having the older load get newer data than the newer load.

SUMMARY OF THE INVENTION

This invention provides a novel means to eliminate the load queue and only cancel the instruction that may have finished with the wrong data.

The invention provides a mis-queue table to hold any rejected attempts to access the cache, or any other reason that an instruction cannot be completed.

In the preferred embodiment, all instructions create an initial entry in the mis-queue table. If the data for the instruction is in the cache and available, the instruction entry in the mis-queue table is taken out of the mis-queue table. The processor does this after searching the mis-queue table for possible ordering problems. The instruction is then marked for completion by the sequencing unit of the processor, using the data found in the cache.

An ordering problem occurs when an older instruction is completed after a newer instruction, and the newer and older instructions access data at the same address.

If the data for the instruction is not available in the cache, or otherwise unable to complete, the instruction entry created in the mis-queue table stays in the mis-queue table until the instruction is ready to complete. When the instruction is ready to complete, such as when data is ready in the cache, the instruction is then marked for completion. The instruction entry is then deleted from the mis-queue table.

When an instruction is ready to complete, the associated entry is deleted from the mis-queue table. A search is made of the mis-queue table for any previous instruction entries involving the same address. If any previous instruction entry is found with the same address as the completing entry, the previous instruction entries are marked as being out of order, since they have not completed yet. As noted before, this can happen, for example, when the instructions have aliased the same data address, and the older instructions have not been notified by the cache that the data is ready for use.

It should be noted that whether all instructions create entries in the mis-queue table, and instruction entries ready to complete are pulled out on the next cycle, or whether only rejected instructions create entries in the mis-queue table, the functional result is the same. The result is that instruction entries corresponding to instructions that complete immediately do not stay in the mis-queue table, and only instruction entries corresponding to instructions that do not complete immediately remain in it.

This eliminates the need to have a load queue since all present instructions are either deemed valid and set to be run or have a corresponding entry placed into a mis-queue table to wait for data.

If a present instruction is completed, the address of the data is checked against the entries in the mis-queue table for a match. If a match is present, the matching entries in the mis-queue table are marked as out of order. That is, a newer instruction accessing data from an address has been set for completion earlier than an older instruction to the same address, then the older instruction is completed out of order, and its entry in the mis-queue table should be marked as such.

Further, when the cache returns valid data for an instruction having an entry in the mis-queue table for awhile, the instruction corresponding to that entry is set for completion. A similar search is made in the mis-queue table for older instruction entries corresponding to instructions accessing data at that address that have not yet completed. If any matches are found, any matching older entries will be marked as out of order.

If a data coherency altering event happens, such as a snoop request, the mis-queue table is interrogated. Any entry with the same address of the data coherency altering event is marked as modified.

When an instruction entry is released from the mis-queue table, the instruction is completed. The processor then determines if certain events have occurred. If an instruction entry in the mis-queue table indicates that the instruction corresponding to that entry is both out of order and modified, any instructions that are supposed to execute after that out of order and modified instruction will be canceled and re-executed, thus preserving data coherency.

DETAILED DESCRIPTION OF THE INVENTION

Figure 1:
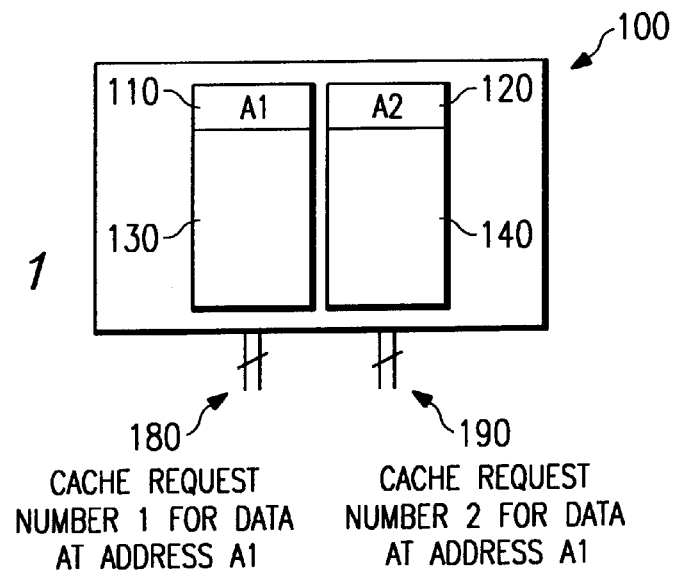
FIG 1 is a diagram of an interleaved cache, showing two instructions attempting to access the same data on one of the cache banks.
Figure 2:
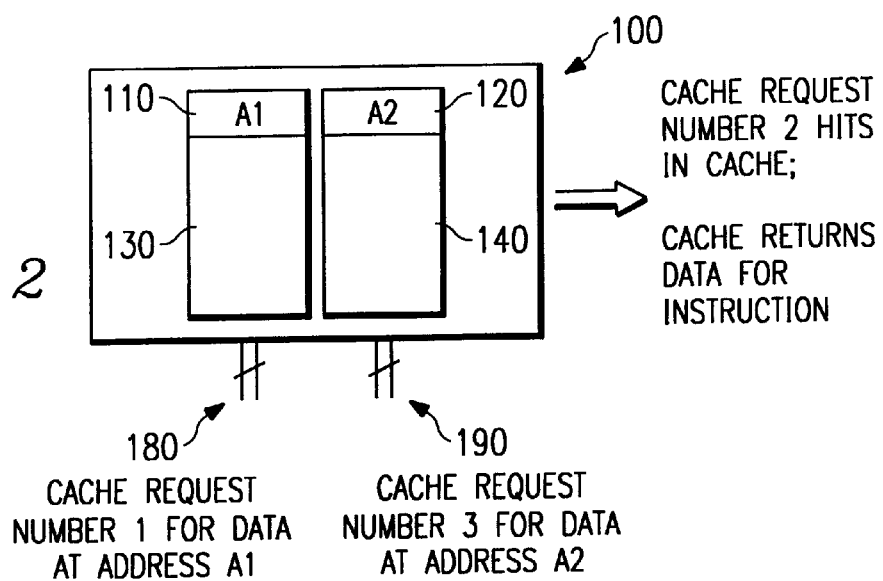
FIG. 2 is a diagram of a newer instruction accessing the data prior to an older instruction in the cache of FIG. 1, and how an out of order completion may occur.
Figure 3:
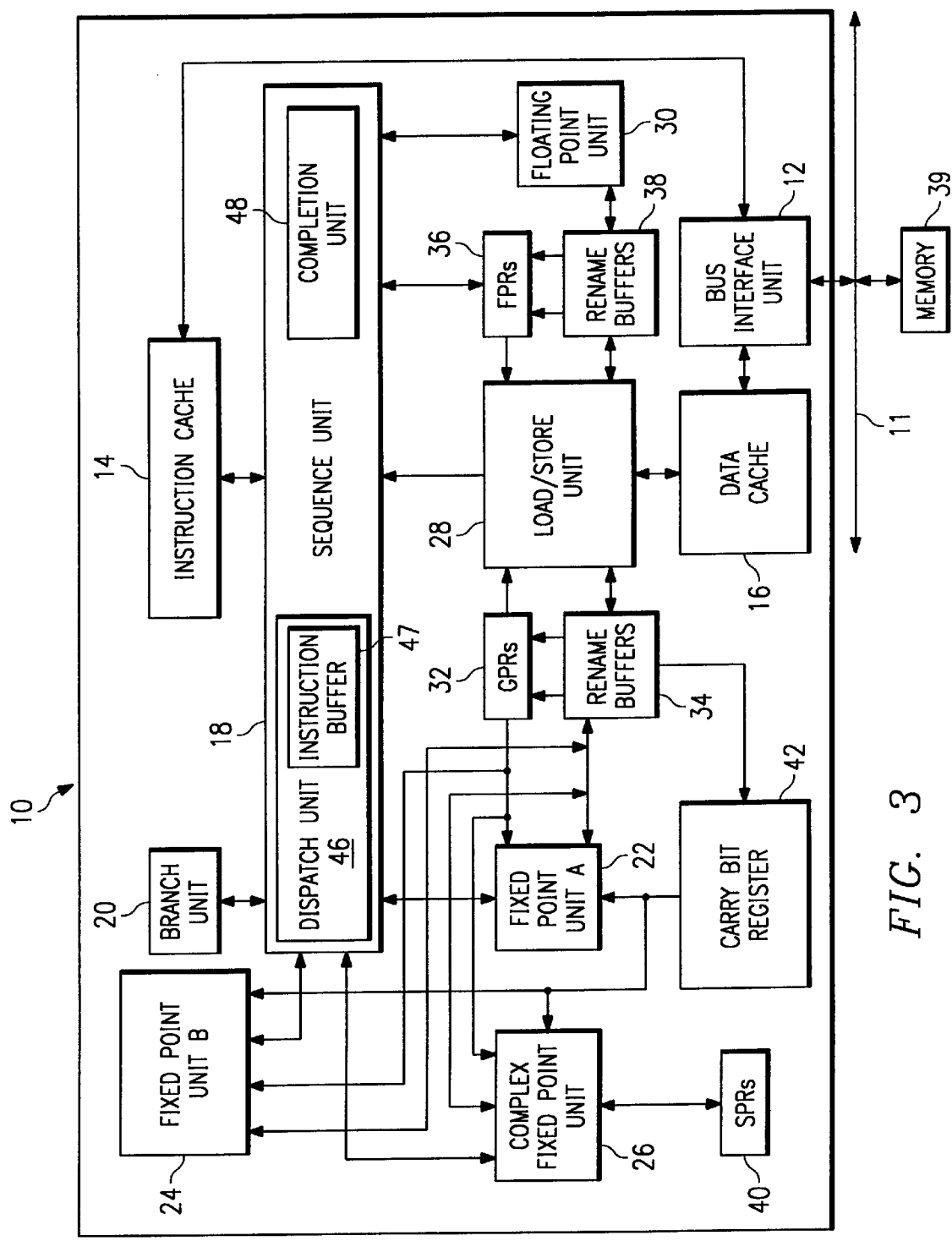
FIG. 3 is a block diagram of a superscalar processor.

FIG. 3 is a block diagram of a processor system 10 for processing information in accordance with the present invention. In the preferred embodiment, processor 10 is a single integrated circuit superscalar microprocessor, such as the PowerPC™ processor from IBM Corporation, Austin, Tex. Accordingly, as discussed further hereinbelow, processor 10 includes various units, registers, buffers, memories, and other sections, all of which are formed by integrated circuitry. Also, in the preferred embodiment, processor 10 operates according to reduced instruction set computing ("RISC") techniques. As shown in FIG. 3, a system bus 11 is connected to a bus interface unit ("BIU") 12 of processor 10. BIU 12 controls the transfer of information between processor 10 and system bus 11.

BIU 12 is connected to an instruction cache 14 and to a data cache 16 of processor 10. Instruction cache 14 outputs instructions to a sequencer unit 18. In response to such instructions from instruction cache 14, sequencer unit 18 selectively outputs instructions to other execution circuitry of processor 10.

In addition to sequencer unit 18 which includes execution units of a dispatch unit 46 and a completion unit 48, in the preferred embodiment the execution circuitry of processor 10 includes multiple execution units, namely a branch unit 20, a fixed point unit a ("FXUA") 22, a fixed point unit B ("FXUB") 24, a complex fixed point unit ("CFXU") 26, a load/store unit ("LSU") 28 and a floating point unit ("FPU") 30. FXUA 22, FXUB 24, CFXU 26 and LSU 28 input their source operand information from general purpose architectural registers ("GPRs") 32 and a fixed point rename buffers 34. Moreover, FXUA 22 and FXUB 24 input a "carry bit" from a carry bit ("CA") register 42. FXUA 22, FXUB 24, CFXU 26 and LSU 28 output results (destination operand information) of their operations for storage at selected entries in fixed point rename buffers 34. Also, CFXU 26 inputs and outputs source operand information and destination operand information to and from special purpose registers ("SPRs") 40.

FPU 30 inputs its source operand information from floating point architectural registers ("FPRs") 26 and floating point rename buffers 38. FPU 30 outputs results (destination operand information) of its operation for storage at selected entries in floating point rename buffers 38.

Sequencer unit 18 inputs and outputs information to and from GPRs 32 and FPRs 36. From sequencer unit 18, branch unit 20 inputs instructions and signals indicating a present state of processor 10. In response to such instructions and signals, branch unit 20 outputs (to sequencer unit 18) signals indicating suitable memory addresses storing a sequence of instructions for execution by processor 10. In response to such signals from branch unit 20, sequencer unit 18 inputs the indicated sequence of instructions from instruction cache 14. If one or more of the sequence of instructions is not stored in instruction cache 14, then instruction cache 14 inputs (through BIU 12 and system bus 11) such instructions from system memory 39 connected to system bus 11.

In response to the instructions input from instruction cache 14, sequencer unit 18 selectively dispatches through a dispatch unit 46 the instructions to selected ones of execution units 20, 22, 24, 26, 28 and 30. Each execution unit executes one or more instructions of a particular class of instructions. For example, FXUA 22 and FXUB 24 execute a first class of fixed point mathematical operations on source operands, such as addition, subtraction, ANDing, Oring and XORing. CFXU 26 executes a second class of fixed point operations on source operands, such as fixed point multiplication and division. FPU 30 executes floating point operations on source operands, such as floating point multiplication and division.

Processor 10 achieves high performance by processing multiple instructions simultaneously at various ones of execution units 20, 22, 24, 26, 28 and 30. Accordingly, each instruction is processed as a sequence of stages, each being executable in parallel with stages of other instructions. Such a technique is called "pipelining". In a significant aspect of the preferred embodiment, an instruction is normally processed at six stages, namely fetch, decode, dispatch, execute, completion and writeback.

In the preferred embodiment, each instruction requires one machine cycle to complete each of the stages of instruction processing. Nevertheless, some instructions (e.g., complex fixed point instructions executed by CFXU 26) may require more than one cycle. Accordingly, a variable delay may occur between a particular instruction's execution and completion stages in response to the variation in time required for completion of preceding instructions.

In response to a Load instruction, LSU 28 inputs information from data cache 26 and copies such information to selected ones of rename buffers 34 and 38. If such information is not stored in data cache 16, then data cache 16 inputs (through BIU 12 and system bus 11) such information from a system memory 39 connected to system bus 11. Moreover, data cache 16 is able to output (through BIU 12 and system bus 11) information from data cache 16 to system memory 39 connected to system bus 11.

Figure 4:
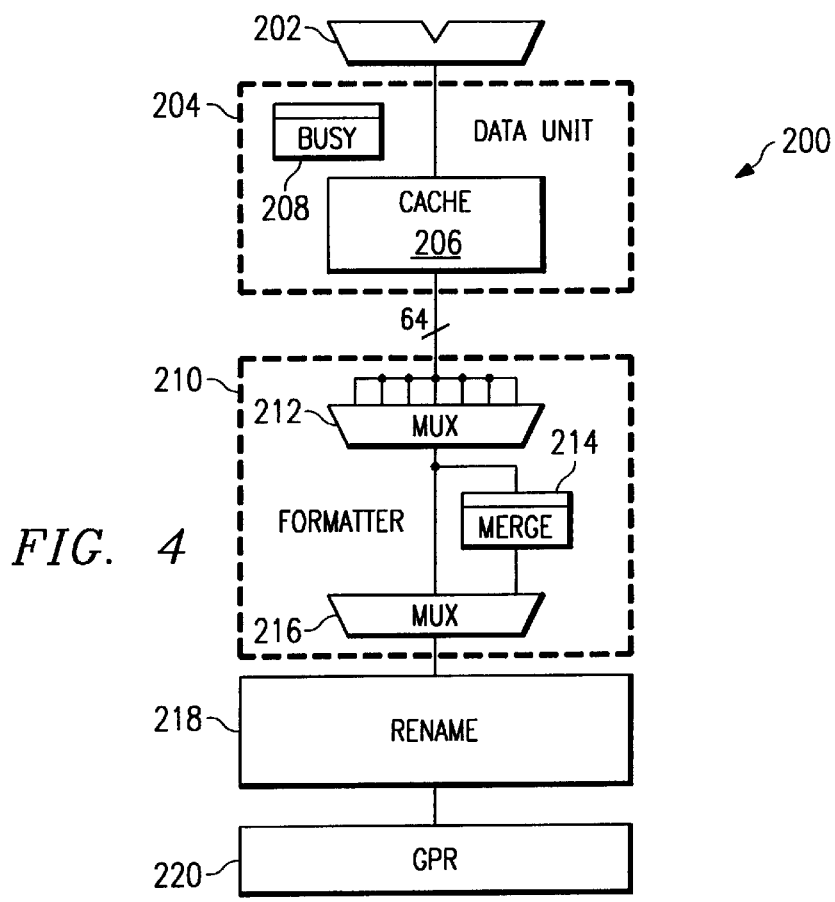
FIG. 4 is a block diagram of a load circuit in a superscalar processor.

Referring now to FIG. 4, there is shown a schematic diagram illustrating a circuit for processing instructions, such as a load, according to an embodiment of the invention. An address to the data unit 204 which contains the control logic required to physically access the cache 206. Cache 206 has an output port connected to, in this case, a 64-bit data line which passes data from the cache 206 into the Formatter 210 to be processed, if the data is in the cache.

In one embodiment of the invention, each time an instruction is dispatched an entry in a mis-queue table 600 is created. If the instruction hits in the data cache, then on the following cycle the entry for that instruction is removed from the mis-queue table 600. However, if the instruction misses in the data cache, then its real address, and possibly its effective address, and other information remains in mis-queue table 600. The processor continually scans the address information in the entries in the mis-queue table, and each cycle the processor attempts to access the cache at the effective address stored in mis-queue table 600. Eventually, the data becomes available in the cache for each of the entries in the mis-queue table 600 and is passed onto the formatter to be processed.

It should be noted, that instead of accessing the cache through the effective address, as explained above, a microprocessor can attempt to access the cache via a real address stored in the cache. It should be noted that this is a matter of implementation, and does not affect the overall invention.

However, it should be noted that a present instruction need not initially be placed in mis-queue table 600 for the current invention to work. The present instruction need only be represented in the mis-queue table 600 when, for whatever reason, the present instruction cannot be set to complete immediately after it is initially introduced by the sequencing unit.

Figure 5:
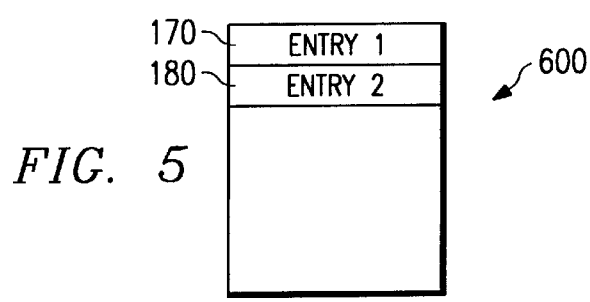
FIG. 5 is a diagram of a mis-queue table according to the preferred embodiment of the invention.

In the preferred embodiment, instruction entries are stored in order in mis-queue table 600. This is diagramed in FIG. 5, where the instruction generating instruction entry 410 is an older instruction than the instruction generating instruction entry 420, thus instruction entry 410 is stored higher in the mis-queue table 600 than instruction 420. However, it should be noted that with appropriate identification and ordering information, instructions could be stored in the mis-queue table in no particular order.

Figure 6:
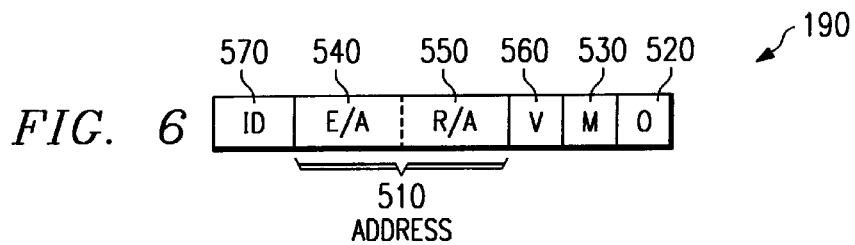
FIG. 6 is a diagram of an entry in mis-queue table showing the fields.

An entry in the mis-queue table is represented in FIG. 6. The minimal information necessary for the invention is an address information field 510, an out of order information field 520, and a modified data information field 530. The address information can also have subfields, including real address information 540, and effective address information 550. The mis-queue table entry may also have other information associated with it, such as a valid field 560, and an instruction id field 570, which could be used as ordering information.

In another embodiment, the entries in the mis-queue table are stored out of order in the mis-queue table. The valid field 560 in FIG. 6 indicates whether the mis-queue table entry is indeed still in the mis-queue table 600. A new entry is created in the first mis-queue table line not having the valid field 560 set. Ordering information is preserved with the use of instruction id field 570.

Figure 7:
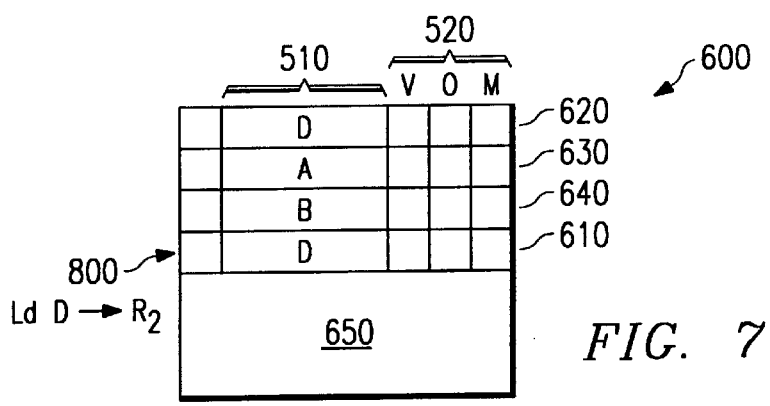
FIGS. 7, 8, 9, and 10 diagram how an embodiment of the present invention detects out of order instruction completion.

Turning now to FIG. 7, a new instruction 800 accessing data at address D is initially presented by the processor. In the preferred embodiment, an entry 610 is created for new instruction 800 in the next available slot in the mis-queue table 600. If new instruction 800 completes immediately, the processor checks the older entries 620, 630, and 640 in mis-queue table 600 against new instruction 800. Specifically, the address of the new instruction 800 is checked against the address information 510 of all older entries in mis-queue table 600 for a comparable address. By definition, all entries contained in mis-queue table 600 must correspond to older instructions than new instruction 800.

It should be noted that if new instruction 800 completes on the next cycle, entry 610 would be deleted. It should also be noted that entry 610 need not be created immediately. The operand address of new instruction 800 could be checked against the address information in the entries in mis-queue table 600, and only if new instruction 800 does not complete with the next clock cycle would entry 610 be created for it.

In an alternative embodiment, entry 610 would not be deleted, but would have the valid field set to indicate it was no longer a valid mis-queue table entry. A newer entry could then use this line in mis-queue table 600.

Suppose the data for new instruction 800 is present in the cache. Then, new instruction 800 is set for completion with the data found for it in the cache. The address that new instruction 800 is supposed to use is then compared against address information 510 in all older entries in the mis-queue table 600. If any matches to the new instruction 800's address are comparable to an address information field 510 in any entry corresponding to an earlier instruction in mis-queue table 600, those matching entries are marked as out of order. Out of order means that a newer instruction has been marked for completion that uses the data at an address that an older instruction, still in the mis-queue table, is also to use. Out of order field 520 is used to mark an entry as out of order.

Figure 8:
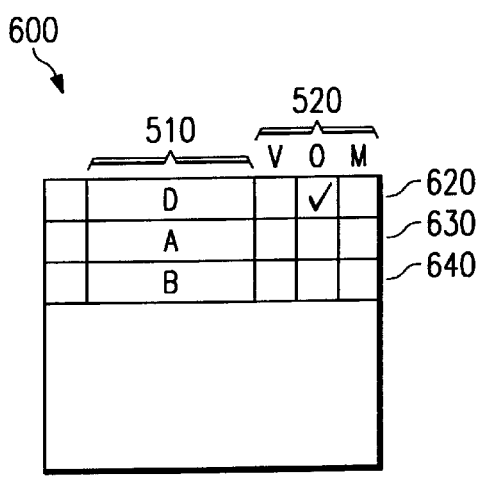

FIG. 8 shows the mis-queue table 600 after instruction 800 has completed on the next clock cycle. Note that instruction entry 620 has been marked as out of order using out of order field 520, since it has not completed and it accesses data at the same memory location as new instruction 800.

Figure 9:
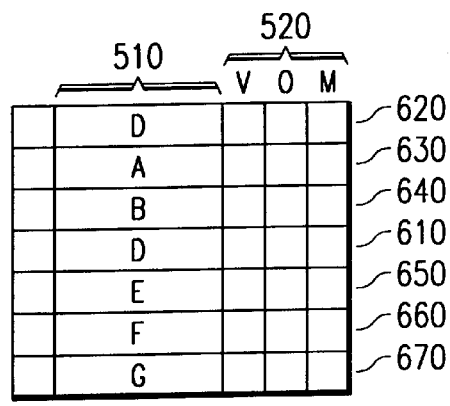

If new instruction 800 has to wait on the data from the cache, it enters the mis-queue table as entry 610 and will remain there until it can complete, as shown in FIG. 9. FIG. 9 also shows that several other instruction entries have been added to the mis-queue table 600 in the interim. At some later time, the data cache has the data ready for new entry 610, but not matching entry 620. Thus, new instruction 800 has completed.

Figure 10:
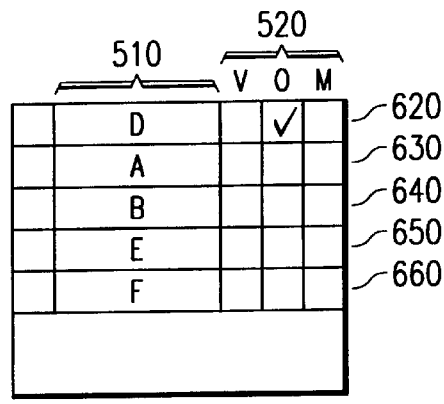
Figure 11A:
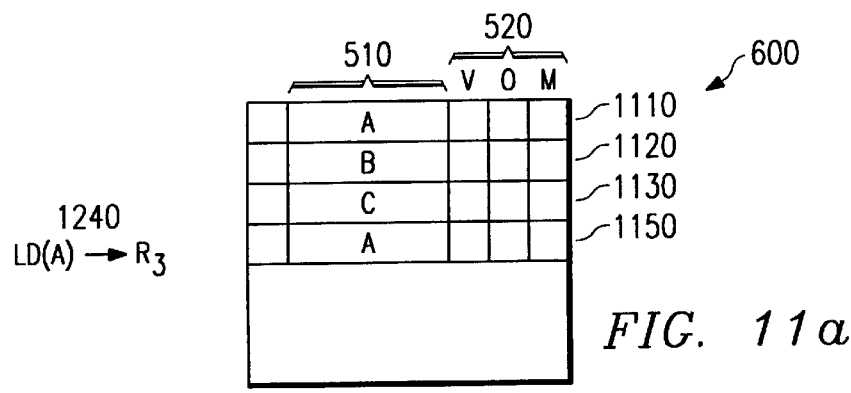
FIGS. 11a, 11b, 11c, and 11d diagram how an embodiment of the invention works.
Figure 11B:
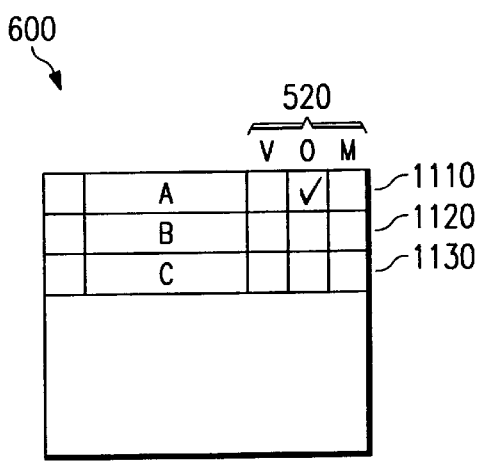
Figure 11C:
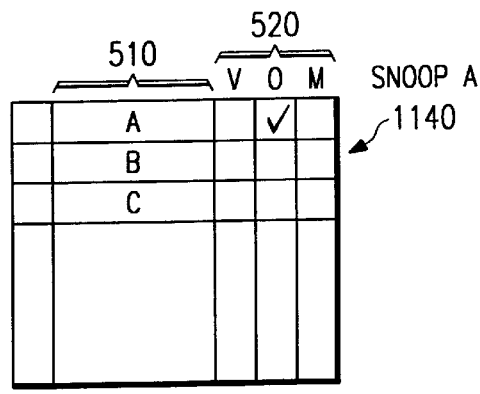
Figure 11D:
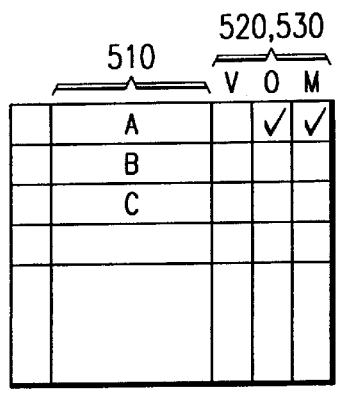

When new instruction 800 is completed, the processor scans the entries in the mis-queue table which correspond to instructions older than instruction 800, that is all entries above corresponding entry 610. The processor searches earlier entries for an address comparable to new instruction entry address field 650. If an older instruction entry going to the same address as found in new instruction entry 610, the older instruction entry is marked as out of order, as shown in FIG. 10.

When new instruction 800 is completed, its entry in mis-queue 600 is deleted. In the preferred embodiment all others entries move up, thus preserving the timing order of the table as shown in FIGS. 9 and 10.

If at any time the data changes for an instruction, the entry must indicate this. Thus, if a snoop, or other indication of data change, occurs while an instruction entry is in mis-queue table 600, modified indicator 530 of the corresponding instruction entry will be set to indicate a potential problem. The processor scans the entries and marks each entry that has an address that indicates the same address on a data change as being modified.

When data coherency has possibly been violated, both the out of order indicator and the modified indicator will both show that these events have occurred. This means a newer instruction which has been set for completion earlier than an older instruction, may have older data associated with it than the older instruction. This would probably violate data coherency.

FIGS. 11a, 11b, 11c, and 11d show a sequence in which this problem is detected. Mis-queue table 600 has initial entries 1110, 1120, and 1130, corresponding to instructions 1210, 1220, and 1230 respectively. New instruction 1240 is initiated going to memory location a, and its data is found in the cache. Entry 1110 is then marked as out of order when new instruction 1240 is completed before it in FIG. 11b. Snoop request 1140 is made indicating that memory location a has changed in FIG. 11c. Upon interrogating mis-queue table 600, entry 1110 is marked as modified. Thus, entry 1110 indicates a data coherency problem with the data coming from a.

It should be noted that new instruction 1240 initiated an entry 1150 in the mis-queue table 600 even when it cleared out immediately. It should be noted that if new instruction 1240 missed in the cache, initiated entry 1150 would remain on the mis-queue table 600. It should also be noted that entry 1150 could be created after the miss. The important thing is that new instruction 1240's operand address be compared to the entries in the mis-queue table, and any matches should be marked if new instruction 1240 completes before the instructions corresponding to older entries 1110, 1120, and 1130.

When an instruction entry is shown to be modified and out of order, as in the case of entry 1110, the newer instruction causing the older instruction entry to be marked as out of order cannot be run. In the preferred embodiment, when the instruction corresponding to entry 1110 is completed, the mis-queue table reports to completion logic that a problem has occurred with the instruction corresponding to this entry. The instruction corresponding to entry 1110 is completed and allowed to execute. However, all instructions following that initiating entry 1110, namely instructions 1220, 1230, and 1240, and any other instructions that completed and are set to execute after the instruction corresponding to entry 1110 are canceled and reset go through the entire run process again.

In the preferred embodiment of the invention, the addresses are only compared to a set granularity. Thus, addresses are only compared to the double word boundary to indicate a potential problem. However, it should be noted that actual addresses could be compared, as well as other granularities.

In the preferred embodiment of the invention, after the error situation is detected, all instructions after the instruction indicating the problem are flushed and reset for execution. Thus data coherency is preserved in the flush of the remaining instructions.

What is claimed:

1. An apparatus for out of order execution of instructions, the apparatus comprising:
   (a) a mis-queue table for holding entries of instruction data, each entry corresponding to an instruction in a computer microprocessor, the instruction data comprising:
      (i) address information for the instruction, the address information being held in an address information field of the respective entry;
      (ii) order information for the instruction, the order information being held in an order information field of the respective entry for indicating the order of the corresponding instruction in relation to other instructions;
      (iii) out of order information, the out of order information being held in an out of order information field of the respective entry for indicating that a newer instruction using data at the address corresponding to the address information field has completed before the current entry;
      (iv) data modification information for the instruction, for indicating a possibility of modified data at the address corresponding to the address information field;
   (b) an out of order comparator for setting the out of order information field of an entry in the mis-queue table upon the completion of a completing instruction, the out of order information field of a compared entry being set if the completing instruction comprises a newer instruction which uses data at the address corresponding to the address information field in the compared entry;
   (c) a modification comparator for comparing address information in the address information field in an entry in the mis-queue table to a possibly modified address, wherein the modification field in the entry is marked to indicate modified data at the address if the possibly modified address is comparable to the address information in the instruction entry being compared.

2. The apparatus of claim 1, wherein the apparatus cancels all instructions following an instruction corresponding to an instruction entry that indicates an out of order instruction and modified data.

3. The apparatus of claim 1 wherein the out of order comparator compares all data address information in an entry to determine if the addresses are comparable.

4. The apparatus of claim 1 wherein the out of order comparator compares a portion of the data address information in an entry to determine if the addresses are comparable.

5. A method for detecting out of order instructions which may cause a data coherency violation in a microprocessor, the method comprising:

(a) preparing a new instruction to execute on the microprocessor, the new instruction having a data address;
   (b) upon completion of the new instruction
      (i) comparing the data address of the instruction to existing entries in a mis-queue table, the instruction entries corresponding to previous instructions, the instruction entries containing address information, instruction order information, an out of order indicator, and a modified data indicator;
      (ii) if the data address of the new instruction is comparable to address information of an entry in the mis-queue table, marking the comparable entry in the mis-queue table as an out of order instruction;
   (c) if the new instruction is presently unable to be completed, creating an entry for the new instruction in the mis-queue table, whereby the data address of the new instruction is put in the address information of the new instruction entry, and information on the order of the instruction is put in the ordering information of the new instruction entry.

6. The method of claim 5 further comprising the steps of:
   (d) continually scanning the mis-queue table for entries corresponding to instructions set to execute;
   (e) when an instruction corresponding to an entry in the mis-queue table is set to execute:
      (i) comparing the address information of the entry corresponding to the instruction set to execute with the address information of entries in the mis-queue table corresponding to older instructions than the instruction set to execute;
      (ii) if an entry is found in the mis-queue table corresponding to an older instruction than the instruction set to execute, and if the address information of the entry corresponding to the instruction set to execute is comparable to the address information in the entry corresponding to the older instruction, the entry corresponding to the older instruction is marked as out of order;
      (iii) removing the entry corresponding to the instruction set to execute from the mis-queue table.

7. The method of claim 6 further comprising the steps of:
   (f) continually scanning for data altering events;
   (g) when a data altering event happens:
      (i) broadcasting the address of the altered data to the mis-queue table;
      (ii) comparing the address of the altered data to address information in the entries of the mis-queue table;
      (iii) if the address of the altered data and the address of an entry in the mis-queue table are comparable, the entry in the mis-queue table having the comparable address is marked as modified.

* * * * *